United States Patent
Brunner

(10) Patent No.: US 7,150,162 B1
(45) Date of Patent: Dec. 19, 2006

(54) STROLLER WITH MISTING SYSTEM

(76) Inventor: Tracy D. Brunner, 979 E. Gulf Dr., Sanibel Island, FL (US) 33957

( * ) Notice: Subject to any disclaimer, the term of this patent is extended or adjusted under 35 U.S.C. 154(b) by 0 days.

(21) Appl. No.: 11/220,271

(22) Filed: Sep. 6, 2005

(51) Int. Cl.
*B01F 3/04* (2006.01)

(52) U.S. Cl. .......................................... 62/306; 280/658

(58) Field of Classification Search ................ 280/647, 280/650, 658, 47.38, DIG. 5; 62/64, 91, 62/239, 244, 259.4, 314, 304, 306, 310
See application file for complete search history.

(56) References Cited

U.S. PATENT DOCUMENTS

| | | | | |
|---|---|---|---|---|
| 4,993,639 A | * | 2/1991 | Hata | 239/289 |
| 5,613,371 A | * | 3/1997 | Nelson | 62/244 |
| 5,620,633 A | * | 4/1997 | Junkel et al. | 261/28 |
| 5,628,273 A | * | 5/1997 | Crouse, II | 114/343 |
| 5,667,732 A | * | 9/1997 | Lederer | 261/28 |
| 5,722,596 A | * | 3/1998 | Dome | 239/289 |
| 5,724,824 A | * | 3/1998 | Parsons | 62/171 |
| 5,725,356 A |   | 3/1998 | Carter | |
| 5,837,167 A | * | 11/1998 | Lederer | 261/28 |
| 6,027,137 A | * | 2/2000 | Rura | 280/650 |
| 6,151,907 A | * | 11/2000 | Hale | 62/314 |
| 6,325,362 B1 | * | 12/2001 | Massey et al. | 261/127 |
| 6,389,835 B1 | * | 5/2002 | Uranga | 62/306 |
| 6,409,206 B1 | * | 6/2002 | Willrich | 280/658 |
| 6,439,521 B1 | * | 8/2002 | Wilson et al. | 248/227.3 |

* cited by examiner

*Primary Examiner*—J. Allen Shriver
(74) *Attorney, Agent, or Firm*—The Livingston Firm; Edward M. Livingston; Angela M. Miller

(57) ABSTRACT

A stroller with a misting system (1) which allows for quick and simple cooling of a child. The misting system is located on a conventional stroller having a child retaining area (2), a canopy (3), at least one handlebar (4) and a plurality of wheels (17). The misting system includes a nozzle (6) located on the stroller canopy (3) and a fluid reservoir (14) which is preferably located on the handlebar (4). The fluid reservoir (14) is pressurized and a misting system on/off switch (9) permits the misting of water (7) from the fluid reservoir (14) out through the nozzle (6). An optional fan (11) located in the canopy (3) may also be included so as to further assist in the cooling of the child.

14 Claims, 2 Drawing Sheets

STROLLER WITH MISTING SYSTEM

BACKGROUND OF THE INVENTION

This invention relates to strollers for babies, infants or toddlers, more particularly, a stroller that includes a misting system to keep a child cool and comfortably while riding in a stroller.

Strollers, often called baby carriages, have been in use for centuries as a way to easily permit a parent or other care-taker to walk with a baby, infant or even toddler. In its most simplistic form, a stroller includes wheels and a housing area wherein the child may sit or lie down.

Through the years, many improvements have been made to the stroller, including the addition of swiveling wheels, braking systems, reclining seats, movable canopies, storage baskets, cup holders, clocks, thermometers, speakers and other high-tech gadgets. In addition, strollers are now made so as to be lightweight, easily collapsible with excellent maneuverability and having wheels bases that can easily tackle rough terrain.

With all the advances in the stroller industry, however, minimal improvements have been made as to keeping a child riding in a stroller cool and comfortable. During warm days, what initially intended on being a nice, leisurely stroll through a park can quickly become a parent's worst nightmare as the child quickly becomes cranky due to the heat. In addition, family trips to theme parks are often spoiled due to a child being too hot or, at the very worst, due to a child becoming sick from overheating or getting heat stroke.

Currently, moveable canopies are used to aid in protecting the child from direct sun exposure, thereby decreasing the temperature within the stroller. However, if the heat index is high, the child will still become hot. In addition, some strollers currently include internally built fans aid in keeping the child cool. However, as the fan is simply moving warm air onto the child, the child may still not be sufficiently cooled.

Thus, a need exists for a stroller having a misting system that keeps a child cool and comfortable while riding in the stroller.

The relevant prior art includes the following references:

| Patent No. (U.S. unless stated otherwise) | Inventor | Issue/Publication Date |
| --- | --- | --- |
| 6,325,362 | Massey et al. | Dec. 4, 2001 |
| 6,027,137 | Rura | Feb. 22, 2000 |
| 6,409,206 | Willrich | Jun. 25, 2002 |
| 6,439,521 | Wilson et al. | Aug. 27, 2002 |
| 5,725,356 | Carter | Mar. 10, 1998 |
| 5,837,167 | Lederer | Nov. 17, 1998 |
| 5,620,633 | Junkel et al. | Apr. 15, 1997 |
| JP02004082984A | Ishinabe | Mar. 18, 2004 |

SUMMARY OF THE INVENTION

The primary object of the present invention is to provide a stroller with a misting system that keeps a child cool and comfortable while riding in the stroller.

A further object of the present invention is to provide a stroller with a misting system that is safe to use.

An even further object of the present invention is to provide a stroller with a misting system that is durable.

Another object of the present invention is to provide a stroller with a misting system that is easy to use.

A further object of the present invention is to provide a stroller with a misting system that is versatile.

The present invention fulfills the above and other objects by providing a stroller with a misting system having a nozzle located on a stroller canopy and a fluid reservoir which is preferably located on a stroller handlebar. The fluid reservoir is pressurized and a misting system on/off switch permits the misting of water from the fluid reservoir out through the nozzle. An optional fan located in the canopy may also be included so as to further assist in the cooling of the child.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
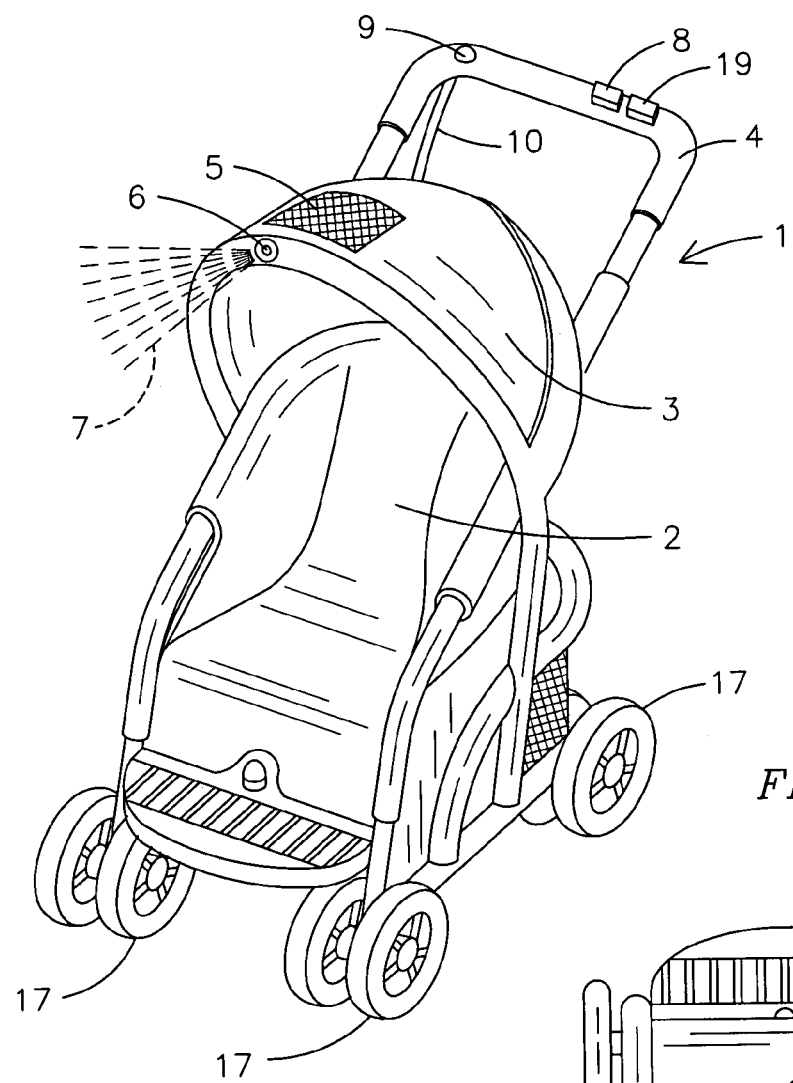
FIG. 1 is a perspective view of the stroller with misting system of the present invention.

For purposes of describing the preferred embodiment, the terminology used in reference to the numbered components in the drawings is as follows:

| | |
| --- | --- |
| 1. | stroller with misting system, generally |
| 2. | child retaining area |
| 3. | canopy |
| 4. | handlebar |
| 5. | flap |
| 6. | nozzle |
| 7. | water |
| 8. | fan on/off switch |
| 9. | misting system on/off switch |
| 10. | tube |
| 11. | fan |
| 12. | fan safety cover |
| 13. | fastening means |
| 14. | fluid reservoir |
| 15. | pump |
| 16. | battery housing |
| 17. | wheels |
| 18. | electrical wiring |
| 19. | variable speed switch |

Figure 2:
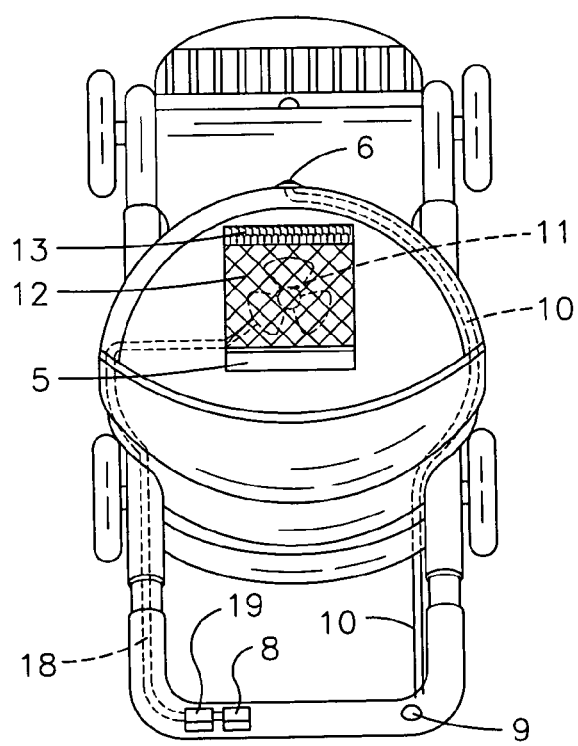
FIG. 2 is a top plan view of the stroller with misting system of the present invention.
Figure 3:
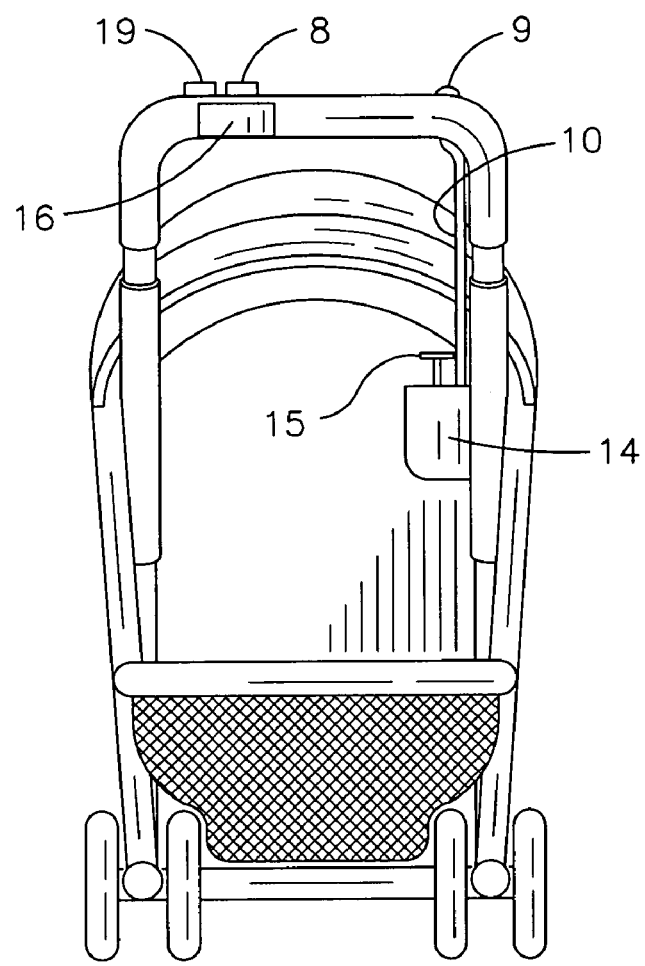
FIG. 3 is a rear view of the stroller with misting system of the present invention.
Figure 4:
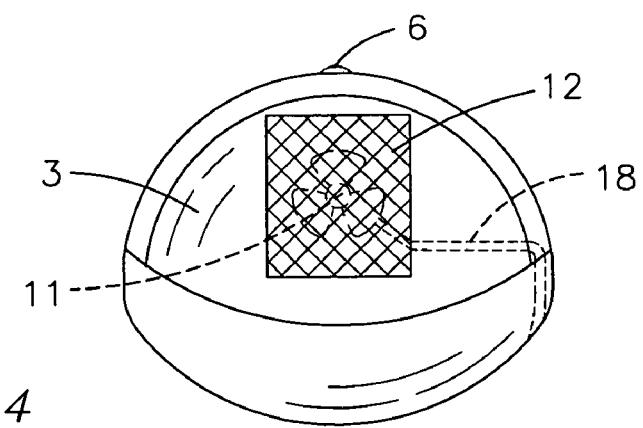
FIG. 4 is an upward looking view of the canopy of the present invention.

With reference to FIGS. 1–4, varying views of the stroller with misting system of the present invention are shown. The stroller 1 may be of various sizes and shapes, but in its most basic form, includes a child retaining area 2, canopy 3, at least one handlebar 4 and wheels 17. The misting system of the present invention includes a nozzle 6 and a reservoir 14 and an optional fan 11.

The misting system, which includes a nozzle 6 connected via a tube 10 to a fluid reservoir 14, allows for a fine mist of water 7 to be expelled in front of the stroller 1. In this manner, water 7 is not directly sprayed onto a child but instead permits an adult to push the stroller 1 into the mist of water 7. However, the nozzle 6 may also be located on other areas of the stroller 1, such as inside the canopy 3, alongside the child retaining area 2, on the sides of the stroller frame or any other desired location. The fluid reservoir 14 is preferably secured to the handlebar 4 for easy access while pushing the stroller 1.

To use the misting system, a person first pumps the pump 15 located in the fluid reservoir 14 so as to create pressure. Then, he or she uses the misting system on/off switch 9 located on the handlebar 4 to have a mist of water 7 squirt out from the nozzle 6.

Although the misting system provides an excellent means for cooling, the addition of a fan 11 in the stroller 1 provides an even more beneficial cooling means. The fan 11, which is preferably battery-powered, is located in the canopy 3 so as to provide air circulation into the child retaining area 2 of the stroller 1. A fan safety cover 12 houses the fan 11 so as to protect a child from inserting his or her fingers into the fan 11. The blades of the fan 11 are preferably made of a soft material, such as polystyrene, so as to further prevent a child from injuring himself or herself on the fan 11. The fan 11 is electrically wired 18 to at least one battery located in a battery housing 16. The electrical wiring 18 may be concealed by the canopy 3 and/or the handlebar 4. A person may activate the fan 11 by turning on a fan on/off switch 8 located on the handlebar 4. A variable speed switch 19 may also be connected to the fan 11 so as to permit a person to change the speed of the fan 11.

A flap 5 having a fastening means 13 is preferably located above the fan safety cover 12 so as to cover the fan 11 when not in use. When fastened, the flap 5 covers the entire fan safety cover 12 and fan 11 so as to prevent rain, snow, sunlight or other elements from entering the child retaining area 2. The fastening means 13 is preferably a hook and loop type material, although buttons, zippers and other fastening means could be used. In addition, although the fastening means 13 is shown only on one edge of the fan safety cover 12, the fastening means 13 could surround the entire fan safety cover 12 so as to provide securement of the flap 5. After the child is misted, a person may turn on the fan 11 so as to further cool the child.

The misting system and fan 11 are preferably independent of one another, but may also be wired so as to run simultaneously.

The use of the present invention will keep a child cool and comfortably while riding in a stroller.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

I claim:

1. A stroller with misting system comprising:
   a stroller having a plurality of wheels, a child retaining area, a canopy and at least one handlebar;
   a nozzle fixedly-located directly on said stroller;
   a fluid reservoir connected to said nozzle;
   a means for expelling fluid from said fluid reservoir through said nozzle;
   a fan located in said canopy;
   said fan is battery-operated;
   a fan safety guard housing said fan; and
   a flap located on said canopy adjacent to said fan safety guard.

2. The stroller with misting system of claim 1 wherein:
   said fluid reservoir is connected to said nozzle via a tube.

3. The stroller with misting system of claim 1 wherein:
   said means for expelling fluid from said fluid reservoir through said nozzle is via an on/off switch.

4. The stroller with misting system of claim 2 wherein:
   said means for expelling fluid from said fluid reservoir through said nozzle is via an on/off switch.

5. The stroller with misting system of claim 1 wherein:
   said fluid reservoir is pressurized.

6. The stroller with misting system of claim 5 wherein:
   said fluid reservoir is pressurized via a pump.

7. The stroller misting system of claim 1 further comprising:
   a means for fastening said flap over said fan safety guard.

8. The stroller misting system of claim 7 wherein:
   said means for fastening said flap over said fan safety guard is via hook and loop material.

9. The stroller misting system of claim 1 further comprising:
   a means for turning said fan on and off.

10. The stroller misting system of claim 9 wherein:
    said means for turning said fan on and off is an on/off switch.

11. The stroller misting system of claim 1 further comprising:
    a means for adjusting a speed of said fan.

12. The stroller misting system of claim 11 wherein:
    said means for adjusting said fan speed is a variable speed switch.

13. The stroller misting system of claim 1 wherein:
    said nozzle is located on said canopy.

14. A stroller with misting system comprising:
    a stroller having a plurality of wheels, a child retaining area, a canopy and at least one handlebar;
    a nozzle located on said stroller canopy;
    a fluid reservoir connected to said nozzle;
    said fluid reservoir is pressurized via a pump;
    an on/off switch for expelling fluid from said fluid reservoir through said nozzle;
    a battery-operated fan located in said canopy;
    an on/off switch for turning said fan on and off;
    a fan safety guard housing said fan;
    a flap located on said canopy adjacent to said fan safety guard;
    a means for fastening said flap over said fan safety guard; and
    a means for adjusting a speed of said fan.

* * * * *